(12) United States Patent
Cheng

(10) Patent No.: US 7,976,923 B2
(45) Date of Patent: Jul. 12, 2011

(54) FASTENING ASSEMBLY AND CUSHION HAVING FASTENING ASSEMBLY

(75) Inventor: Sen-Mei Cheng, Chang Hua County (TW)

(73) Assignee: Taiwan Paiho Limited, Chang Hua County (TW)

( * ) Notice: Subject to any disclaimer, the term of this patent is extended or adjusted under 35 U.S.C. 154(b) by 317 days.

(21) Appl. No.: 12/372,855

(22) Filed: Feb. 18, 2009

(65) Prior Publication Data

US 2010/0146745 A1 Jun. 17, 2010

(30) Foreign Application Priority Data

Dec. 12, 2008 (TW) ................................ 97148354 A

(51) Int. Cl.
*A44B 18/00* (2006.01)
(52) U.S. Cl. ............. 428/77; 428/100; 428/900; 24/442
(58) Field of Classification Search .................. 428/100, 428/77, 900; 24/442
See application file for complete search history.

(56) References Cited

U.S. PATENT DOCUMENTS

| | | | |
|---|---|---|---|
| 4,931,344 A | 6/1990 | Ogawa et al. | |
| 6,044,525 A | 4/2000 | Sastre et al. | |
| 6,068,122 A | 5/2000 | Burns et al. | |
| 6,123,187 A | 9/2000 | Bartels | |
| 6,200,026 B1 | 3/2001 | Carmichael | |
| 6,308,876 B1 | 10/2001 | Havens | |
| 6,348,252 B1 | 2/2002 | Kenney et al. | |
| 6,427,839 B1 | 8/2002 | Helfer-Grand | |
| 6,481,063 B2 | 11/2002 | Shepard et al. | |
| 6,604,630 B1 | 8/2003 | Cabatic et al. | |
| 6,606,765 B2 | 8/2003 | Edmondson | |
| 6,684,464 B1 | 2/2004 | Mody et al. | |
| 6,737,974 B2 | 5/2004 | Dickinson | |
| 6,890,138 B1 | 5/2005 | Myrick | |
| 6,976,437 B2 | 12/2005 | Fisch et al. | |
| 7,021,825 B1 | 4/2006 | Schultz | |
| 7,303,711 B2 | 12/2007 | Gallant et al. | |
| 2009/0106954 A1* | 4/2009 | Brockman | 24/442 |

FOREIGN PATENT DOCUMENTS

JP 2002078512 A 3/2002

\* cited by examiner

*Primary Examiner* — Alexander Thomas
(74) *Attorney, Agent, or Firm* — Ming Chow; Sinorica, LLC

(57) ABSTRACT

A fastening assembly and a cushion having the same are provided. The fastening assembly includes a first band, a second band, a third band, and a magnetic layer. The first band has a first surface protrudingly provided with plural hooks, and a second surface. The second band has a third surface and a fourth surface, with the third surface bonded to the second surface of the first band. The second band is wider than the first band and forms a pair of wings protruding beyond longitudinal edges of the first band, respectively. The third band, narrower than the second band, has a fifth surface and a sixth surface, with the fifth surface bonded to a central portion of the fourth surface of the second band. The magnetic layer is located on the third surface or the fourth surface of the wings of the second band and comprises a magnetic material.

19 Claims, 5 Drawing Sheets

FASTENING ASSEMBLY AND CUSHION HAVING FASTENING ASSEMBLY

BACKGROUND OF THE INVENTION

1. Technical Field

The present invention relates to a fastening assembly and, more particularly, to a fastening assembly co-molded with a foam article.

2. Description of Related Art

The conventional hook-and-loop fastener was invented by George de Mestral, a Swiss engineer, under the inspiration of burrs. The hook-and-loop fastener consists of a hook side woven with tiny hooks and a loop side covered with even smaller and finer loop-like fastening structures. When the hook side and the loop side are pressed together, the hooks on the hook side are caught in the loop-like fastening structures on the loop side so that the two sides are fastened together.

In recent years, the hook-and-loop fastener, which is easily assembled and detached, is often coupled and used with other articles. When a hook-and-loop fastener is applied to a foam article such as a seat cushion, a buffer pad, and so on, the hook-and-loop fastener is bonded to the foam article with the hooks of the hook-and-loop fastener facing outward so as to fasten with another article having a corresponding loop side. Typically, a seat cushion with a hook-and-loop fastener is manufactured by placing the hook-and-loop fastener at a predetermined location in a mold and introducing a foam material into the mold. The foam material is co-molded with the hook-and-loop fastener and, when completely set, takes on the shape defined by the mold.

However, while the foam material expands, the expanding foam material generates a pushing force in all directions. If the hook-and-loop fastener is not securely positioned at the predetermined location in the mold, the pushing force generated during the foaming process tends to push the hook-and-loop fastener away from the predetermined location so that the foam article thus formed becomes defective, with the hook-and-loop fastener displaced. A traditional solution, as disclosed in U.S. Pat. No. 6,348,252, is to equip the mold with a magnet in advance and provide a layer of magnetic material on a base of the hook-and-loop fastener, whereby the hook-and-loop fastener is attracted and attached to the mold by magnetic force. However, if the magnetic material is provided only on the base of the hook-and-loop fastener, the magnetic force produced is sufficient so that the hook-and-loop fastener is still likely to be shifted away from the predetermined location.

BRIEF SUMMARY OF THE INVENTION

In order to overcome the aforesaid drawback of the prior art, the present invention provides a fastening assembly essentially comprising a first band, a second band, a third band, and a magnetic layer. The first band has a first surface and a second surface, wherein the first surface is protrudingly provided with a plurality of hooks. The second band is wider than the first band and has a third surface and a fourth surface, wherein the third surface is bonded to the second surface of the first band so that the second band forms a pair of wings protruding outward beyond longitudinal edges of the first band, respectively. The third band is narrower than the second band and has a fifth surface and a sixth surface, wherein the fifth surface is bonded to a central portion of the fourth surface of the second band. The magnetic layer is located on at least one of the third surface and the fourth surface of the wings of the second band and comprises a magnetic material for providing magnetic attraction to a magnet of a mold.

Therefore, a primary objective of the present invention is to provide a fastening assembly comprising a magnetic material so that the fastening assembly is readily secured in position to a mold by magnetic force during a foaming molding process and easily removed from the mold after the foaming molding process is completed.

Another objective of the present invention is to provide a fastening assembly having two wings each comprising a magnetic material whereby the fastening assembly is tightly secured at a predetermined location in a mold during a foaming molding process.

Still another objective of the present invention is to provide a fastening assembly having two wings each comprising a magnetic material, wherein the wings protect hooks of the fastening assembly from being damaged by a foam material which might otherwise come into contact with the hooks during a foaming process.

In addition, the present invention also provides a cushion having a fastening assembly. The cushion comprises a foam cushion body and at least one fastening assembly, wherein the foam cushion body and the fastening assembly are molded into one piece. The fastening assembly essentially comprises a first band, a second band, a third band, and a magnetic layer. The first band has a first surface and a second surface, wherein the first surface is protrudingly provided with a plurality of hooks. The second band is wider than the first band and has a third surface and a fourth surface, wherein the third surface is bonded to the second surface of the first band so that the second band forms a pair of wings protruding outward beyond longitudinal edges of the first band, respectively. The third band is narrower than the second band and has a fifth surface and a sixth surface, wherein the fifth surface is bonded to a central portion of the fourth surface of the second band. The magnetic layer is located on at least one of the third surface and the fourth surface of the wings of the second band and comprises a magnetic material for providing magnetic attraction to a magnet of a mold.

Hence, a further objective of the present invention is to provide a cushion having a fastening assembly, wherein the fastening assembly comprises a magnetic material so that the fastening assembly is readily secured in position to a mold by magnetic force during a foaming molding process and easily removed from the mold after the foaming molding process is completed.

Still another objective of the present invention is to provide a cushion having a fastening assembly, wherein the fastening assembly has two wings each comprising a magnetic material so that the fastening assembly is unlikely to shift in position when pushed by a foam material during a foaming molding process, thus allowing the fastening assembly to be positioned at a predetermined location on the cushion.

Yet another objective of the present invention is to provide a cushion having a fastening assembly, wherein the fastening assembly has two wings each comprising a magnetic material so that the wings protect hooks of the fastening assembly from being damaged by a foam material which might otherwise come into contact with the hooks during a foaming process.

BRIEF DESCRIPTION OF THE SEVERAL VIEWS OF THE DRAWINGS

The invention as well as a preferred mode of use, further objectives and advantages thereof will be best understood by referring to the following detailed description of illustrative embodiments in conjunction with the accompanying drawings, wherein.

DETAILED DESCRIPTION OF THE INVENTION

Disclosed herein are a fastening assembly and a cushion having the same. Since the physical principles involved in the present invention and the basic connection relations among related elements are well known to persons of ordinary skill in the art, a detailed description of such principles and relations is omitted herein. Besides, the drawings referred to in the following description are not drawn according to actual dimensions and need not be so because they are intended to demonstrate features of the present invention only schematically.

Figure 1A:
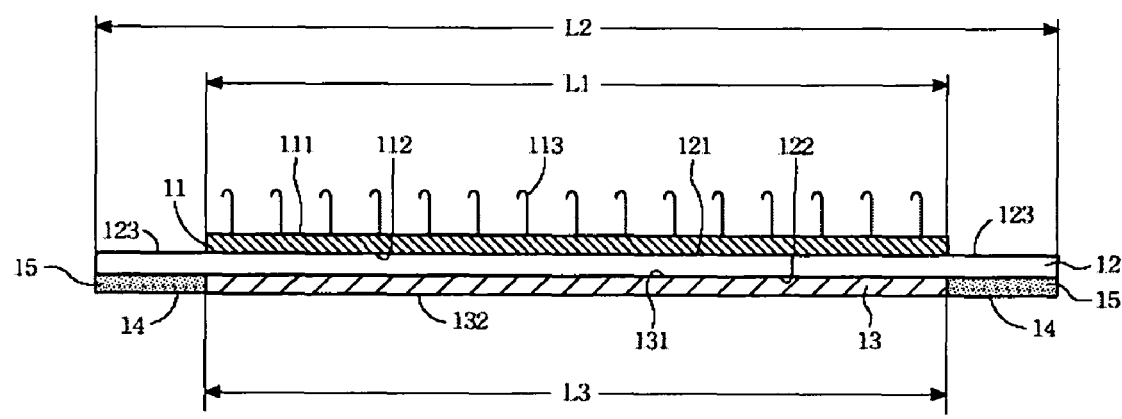
FIG. 1A is a sectional view of a fastening assembly according to a first preferred embodiment of the present invention.

Referring to FIG. 1A for a sectional view of a fastening assembly 1 according to a first preferred embodiment of the present invention, the fastening assembly 1 essentially comprises a first band 11, a second band 12, a third band 13, and a magnetic layer 14. The first band 11 has a first surface 111 and a second surface 112, wherein the first surface 111 is protrudingly provided with a plurality of hooks 113. The second band 12, having a width L2 greater than a width L1 of the first band 11, has a third surface 121 and a fourth surface 122, wherein the third surface 121 is bonded to the second surface 112 of the first band 11 so that the second band 12 forms a pair of wings 123 protruding outward beyond longitudinal edges of the first band 11, respectively. The second band 12 is preferably made of a tough material such as a non-woven material, a fibrous material, a plastic film, and so on.

The third band 13 has a fifth surface 131 and a sixth surface 132. The third band 13 and the first band 11 are located on opposite sides of the second band 12, with the fifth surface 131 of the third band 13 bonded to a central portion of the fourth surface 122 of the second band 12. The third band 13 has a width L3 smaller than the width L2 of the second band 12 and generally equal to the width L1 of the first band 11. The third band 13 engages with a foam material molded and formed in a subsequent foaming process. The third band 13 supports and enhances an overall strength of the fastening assembly 1 so as to prevent the bands from folding or deformation which might otherwise occur during operations in the manufacturing process. Therefore, the third band 13 is preferably made of a tough material such as a non-woven material, a fibrous material, a plastic film, and so on. Furthermore, in order to provide a good supporting effect, the material of which the third band 13 is made is harder than the material of which the second band 12 is made.

Figure 1B:
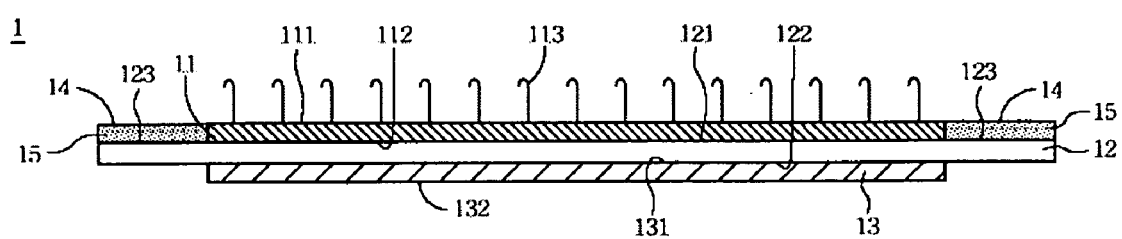
FIG. 1B is a sectional view of a fastening assembly according to another aspect of the first preferred embodiment of the present invention.
Figure 1C:
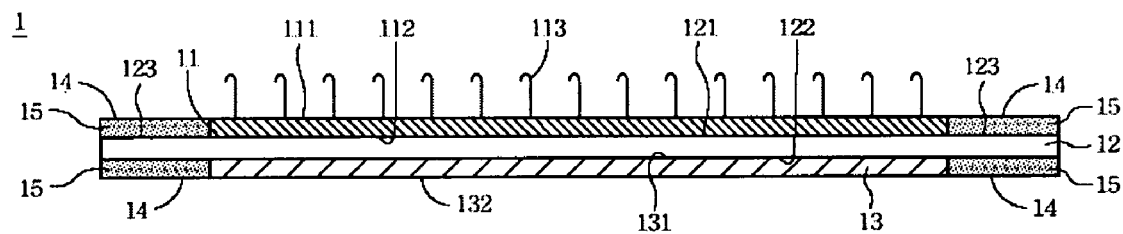
FIG. 1C is a sectional view of a fastening assembly according to still another aspect of the first preferred embodiment of the present invention.

Referring to FIGS. 1A, 1B, and 1C, the magnetic layer 14 comprises a magnetic material 15 and is located on the third surface 121 or the fourth surface 122 of the wings 123 of the second band 12, as shown in FIGS. 1A and 1B. Alternatively, the magnetic layer 14 is provided on both the third surface 121 and the fourth surface 122 of the wings 123, as shown in FIG. 1C. The magnetic layer 14 is made of any material that can be transformed from a solid phase to a liquid phase, preferably polyurethane (PU), and printed on one of the third surface 121 and the fourth surface 122 of the second band 12. It is understood that the magnetic layer 14 may also be printed on both the third surface 121 and the fourth surface 122 if necessary.

Figure 1D:
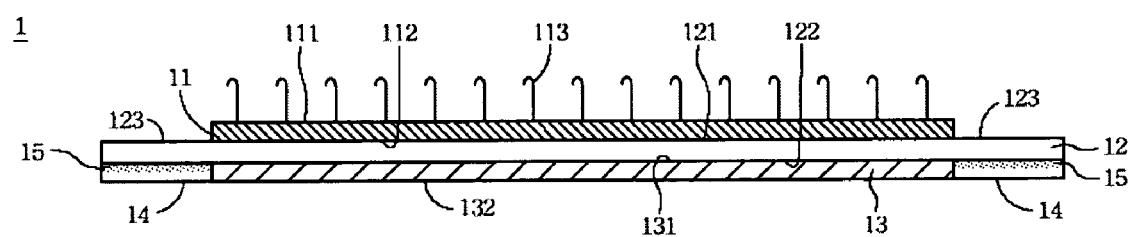
FIG. 1D is a sectional view of a fastening assembly according to yet another aspect of the first preferred embodiment of the present invention.

The magnetic material 15 is integrated with the magnetic layer 14 by mixing the magnetic material 15 into the magnetic layer 14 so that the magnetic material 15 is evenly distributed therein, as shown in FIG. 1A. Alternatively, the magnetic material 15 is coated substantially evenly on a surface of the magnetic layer 14 by a coating technique, as shown in FIG. 1D, wherein the surface is either a surface of the magnetic layer 14 that is bonded to the second band 12 or an exposed surface of the magnetic layer 14. The magnetic material 15 is preferably iron powder or powder a ferrous alloy, provided the magnetic material 15 provides magnetic attraction to magnets.

Figure 1E:
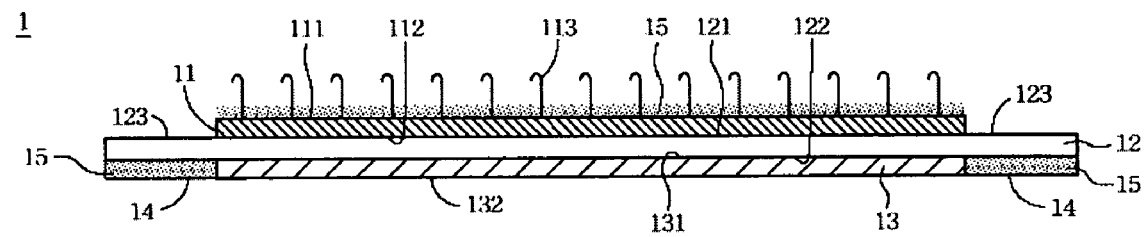
FIG. 1E is a sectional view of a fastening assembly according to a further aspect of the first preferred embodiment of the present invention.

Referring to FIG. 1E, in addition to the wings 123 of the second band 12, the first surface 111 of the first band 11 also comprises the magnetic material 15 so as to impart enhanced magnetism to the fastening assembly 1 and thereby produce a stronger securing effect.

Figure 1F:
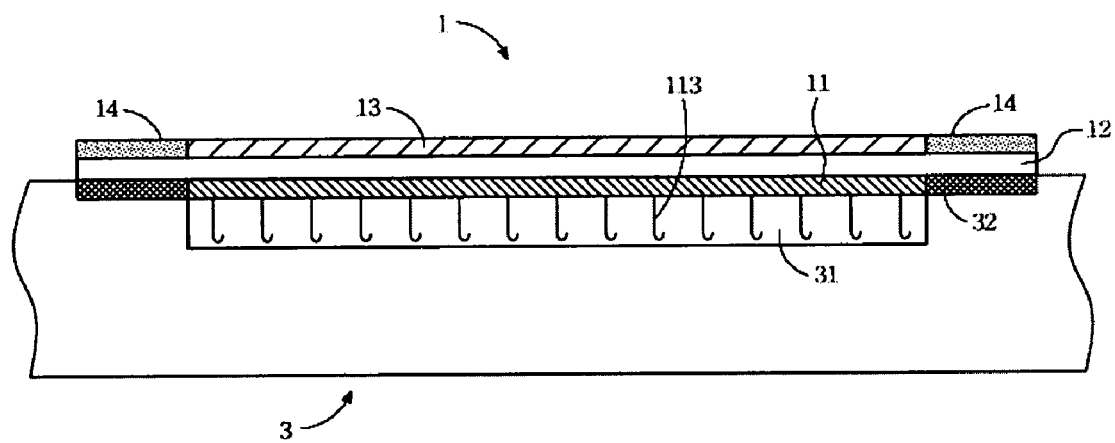
FIG. 1F is a sectional view of the fastening assembly according to the first preferred embodiment of the present invention when placed in a foaming mold.

FIG. 1F clearly demonstrates the function of the pair of wings 123 of the fastening assembly 1. A mold 3 is equipped with a magnet 32 at a predetermined location 31 for accommodating the fastening assembly 1. When the fastening assembly 1 is placed in the mold 3, the magnetic material 15 of the wings 123 is attracted magnetically to the magnet 32 of the mold 3, and thus the fastening assembly 1 is attracted and attached magnetically to the predetermined location 31 of the mold 3 for accommodating the fastening assembly 1, so that the hooks 113 are enclosed between the mold 3 and the second band 12. Hence, during the foaming process, the two wings 123 prevent the foam material from penetrating into the enclosure and damaging the hooks 113 of the fastening assembly 1. The number, shape, and location of the magnet 32 are not limited as long as the two wings 123 are magnetically attracted and securely attached thereto.

Besides the foregoing fastening assembly 1 in the first preferred embodiment, the present invent also provides a cushion having a fastening assembly as a second preferred embodiment.

Figures 2A, 2B:
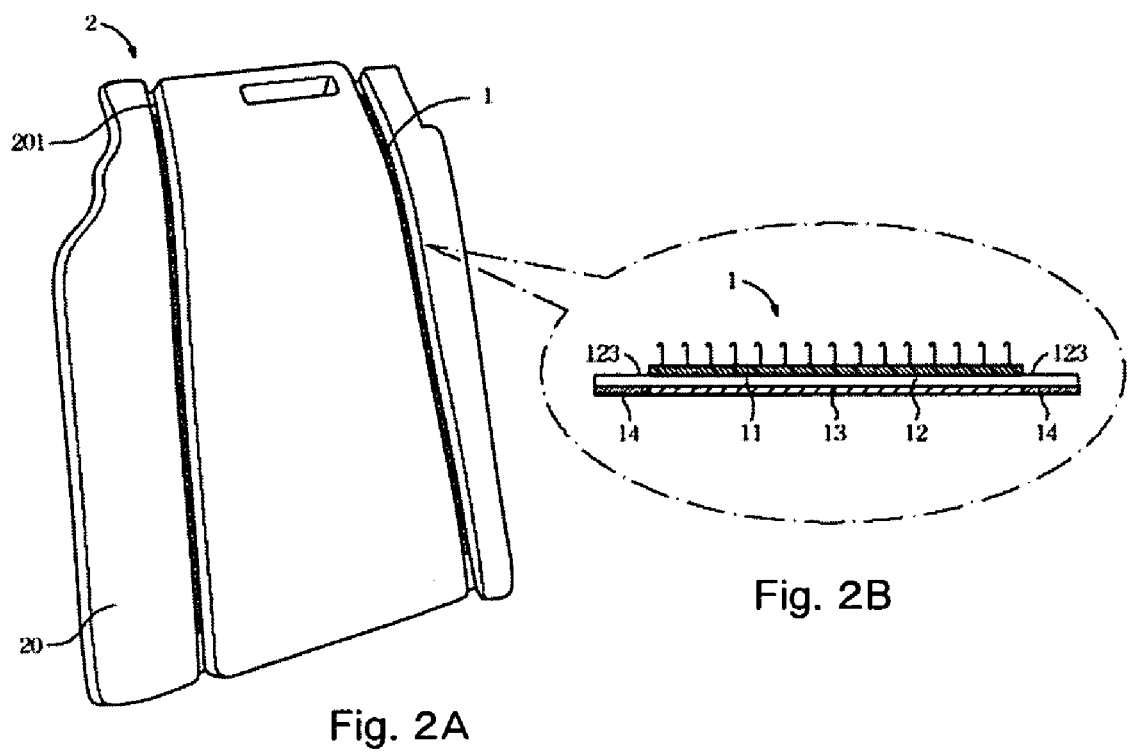
FIG. 2A is a perspective view of a cushion having a fastening assembly according to a second preferred embodiment of the present invention.
FIG. 2B is a partial, enlarged sectional view of the fastening assembly in FIG. 2A according to the second preferred embodiment of the present invention.

Referring to FIG. 2A for a perspective view of a cushion 2 having a fastening assembly 1 according to the second preferred embodiment of the present invention, the cushion 2 comprises a foam cushion body 20 and at least one fastening assembly 1. The foam cushion body 20 and the fastening assembly 1 are molded into one piece. Referring to FIG. 2B for a partial, enlarged sectional view of the fastening assembly 1 in FIG. 2A, the fastening assembly 1 is similar to its counterpart in the first preferred embodiment in comprising essentially a first band 11, a second band 12, a third band 13, and a magnetic layer 14. The above-cited components have substantially the same features and connection relations as their equivalents in the first preferred embodiment and therefore are not described repeatedly herein. In addition, the third band 13, the wings 123 of the second band 12, and the magnetic layer 14 are engaged with the foam cushion body 20. Thus, with the fastening assembly 1, the cushion 2 is fastened to an article (such as a leather bolster of a seat cushion or a backrest of a chair) having corresponding fastening structures.

Moreover, in a preferred mode of implementation, the foam cushion body 20 further has at least one groove 201 for receiving the fastening assembly 1 therein to allow the cushion 2 to engage other articles having corresponding fastening structures.

The present invention is herein illustrated by reference to the preferred embodiments and the corresponding drawings to enable one skilled in the art to carry out the present invention. However, the embodiments are provided for illustrative purposes only but not intended to limit the scope of the present invention. In other words, changes or modifications which are made to the disclosed embodiments without departing from the spirit of the present invention should fall within the scope of the present invention, which is defined only by the appended claims.

The invention claimed is:

1. A fastening assembly, comprising a first band having a first surface and a second surface, the first surface being protrudingly provided with a plurality of hooks, the fastening assembly being characterized by further comprising:
    a second band being wider than the first band and having a third surface and a fourth surface, the third surface being bonded to the second surface of the first band so that the second band forms a pair of wings protruding outward beyond longitudinal edges of the first band, respectively;
    a third band being narrower than the second band and having a fifth surface and a sixth surface, the fifth surface being bonded to a central portion of the fourth surface of the second band; and
    a magnetic layer comprising a magnetic material and located on at least one of the third surface and the fourth surface of the wings of the second band,
wherein the magnetic material of the magnetic layer is substantially evenly distributed on a surface of the magnetic layer.

2. The fastening assembly as claimed in claim 1, wherein the second band is made of a non-woven material.

3. The fastening assembly as claimed in claim 1, wherein the second band is made of a fibrous material.

4. The fastening assembly as claimed in claim 1, wherein the second band is made of a plastic film.

5. The fastening assembly as claimed in claim 1, wherein the third band is made of a non-woven material.

6. The fastening assembly as claimed in claim 1, wherein the third band is made of a fibrous material.

7. The fastening assembly as claimed in claim 1, wherein the third band is made of a plastic film.

8. The fastening assembly as claimed in claim 1, wherein the third band is made of a material harder than a material of which the second band is made of.

9. The fastening assembly as claimed in claim 1, wherein the magnetic layer is made of polyurethane.

10. The fastening assembly as claimed in claim 9, wherein the polyurethane is printed and formed on one of the third surface and the fourth surface of the second band.

11. The fastening assembly as claimed in claim 1, wherein the magnetic layer is formed on both the third surface and the fourth surface of the second band.

12. The fastening assembly as claimed in claim 1, wherein the magnetic material of the magnetic layer is substantially evenly distributed in the magnetic layer.

13. The fastening assembly as claimed in claim 1, wherein the magnetic material of the magnetic layer is substantially evenly distributed on a surface of the magnetic layer that is bonded to the second band.

14. The fastening assembly as claimed in claim 1, wherein the magnetic material of the magnetic layer is substantially evenly distributed on an exposed surface of the magnetic layer.

15. The fastening assembly as claimed in claim 1, wherein the magnetic material is iron powder.

16. The fastening assembly as claimed in claim 1, wherein the magnetic material is powder of a ferrous alloy.

17. A fastening assembly, comprising a first band having a first surface and a second surface, the first surface being protrudingly provided with a plurality of hooks, the fastening assembly being characterized by further comprising:
    a second band being wider than the first band and having a third surface and a fourth surface, the third surface being bonded to the second surface of the first band so that the second band forms a pair of wings protruding outward beyond longitudinal edges of the first band, respectively;
    a third band being narrower than the second band and having a fifth surface and a sixth surface, the fifth surface being bonded to a central portion of the fourth surface of the second band; and
a magnetic layer comprising a magnetic material and located on at least one of the third surface and the fourth surface of the wings of the second band, wherein the first surface of the first band comprises the magnetic material.

18. A cushion having a fastening assembly, the cushion comprising a foam cushion body and at least a fastening assembly, the foam cushion body and the fastening assembly being molded into one piece, the cushion being characterized in that the fastening assembly comprising:
    a first band having a first surface and a second surface, the first surface being protrudingly provided with a plurality of hooks;
    a second band being wider than the first band and having a third surface and a fourth surface, the third surface being bonded to the second surface of the first band so that the second band forms a pair of wings protruding outward beyond longitudinal edges of the first band, respectively;
    a third band being narrower than the second band and having a fifth surface and a sixth surface, the fifth surface being bonded to a central portion of the fourth surface of the second band; and
    a magnetic layer comprising a magnetic material and located on at least one of the third surface and the fourth surface of the wings of the second band, wherein the magnetic material of the magnetic layer is substantially evenly distributed on a surface of the magnetic layer.

19. The cushion having the fastening assembly as claimed in claim 18, wherein the foam cushion body further has at least a groove for receiving the fastening assembly.

* * * * *